United States Patent
Wu et al.

(10) Patent No.: US 10,455,286 B2
(45) Date of Patent: Oct. 22, 2019

(54) PROTECTED MEDIA DECODING SYSTEM SUPPORTING METADATA

(71) Applicant: Microsoft Technology Licensing, LLC, Redmond, WA (US)

(72) Inventors: Yongjun Wu, Bellevue, WA (US); Balachandar Sivakumar, Sammamish, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/296,924

(22) Filed: Mar. 8, 2019

(65) Prior Publication Data
US 2019/0208276 A1 Jul. 4, 2019

Related U.S. Application Data (63) Continuation of application No. 14/581,760, filed on Dec. 23, 2014, now abandoned.

(51) Int. Cl.
| | |
|---|---|
| *H04N 7/167* | (2011.01) |
| *H04N 21/4627* | (2011.01) |
| *H04N 21/4408* | (2011.01) |
| *G06F 21/10* | (2013.01) |
| *H04N 21/4385* | (2011.01) |
| *H04N 21/435* | (2011.01) |

(52) U.S. Cl.
CPC ......... *H04N 21/4627* (2013.01); *G06F 21/10* (2013.01); *H04N 21/4353* (2013.01); *H04N 21/43853* (2013.01); *H04N 21/4408* (2013.01)

(58) Field of Classification Search
CPC ........... H04N 21/4181; H04N 21/4627; H04N 21/4353; H04N 21/4408; G06F 21/10
See application file for complete search history.

(56) References Cited

U.S. PATENT DOCUMENTS

| | | | |
|---|---|---|---|
| 2010/0066904 A1* | 3/2010 | Schindler | H04N 5/44513 348/468 |
| 2013/0202109 A1* | 8/2013 | Ducharme | H04N 21/23476 380/200 |
| 2014/0247887 A1* | 9/2014 | Brueck | H04N 19/40 375/240.26 |

* cited by examiner

*Primary Examiner* — Olugbenga O Idowu
(74) *Attorney, Agent, or Firm* — Newport IP, LLC; Benjamin A. Keim (57) ABSTRACT

Video content is protected using a digital rights management (DRM) mechanism, the video content having been previously encrypted and compressed for distribution, and also including metadata such as closed captioning data, which might be encrypted or clear. The video content is obtained by a system of a computing device, the metadata is extracted from the video content and provided to a video decoder, and the video content is provided to a secure DRM component. The secure DRM component decrypts the video content and provides the decrypted video content to a secure decoder component of a video decoder. As part of the decryption, the secure DRM component drops the metadata that was included in the obtained video content. However, the video decoder receives the extracted metadata in a non-protected environment and thus is able to provide the extracted metadata and the decoded video content to a content playback application.

20 Claims, 5 Drawing Sheets

PROTECTED MEDIA DECODING SYSTEM SUPPORTING METADATA

CROSS REFERENCE TO RELATED APPLICATION

This patent application claims the benefit of U.S. patent application Ser. No. 14/581,760 filed Dec. 23, 2014, entitled "PROTECTED MEDIA DECODING SYSTEM SUPPORTING METADATA," which is hereby incorporated in its entirety by reference.

BACKGROUND

A variety of different types of computing devices are used for content playback, including smart phones, game consoles, laptop computers, dedicated playback devices, and so forth. Digital rights management techniques have been developed to control access to content so that the content is used by these various devices in the manner desired by the content owners. However, these digital rights management techniques are not without their problems. One such problem is that these digital rights management techniques can end up dropping metadata included in the media content. This can result in making such metadata unavailable to applications playing back the content on the computing devices and thus unavailable to users, which can be frustrating for users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device video content is obtained from a media source, the video content including multiple video frames that include metadata as well as protected video content. The metadata is extracted from the multiple video frames and provided to a video decoder. The multiple video frames are provided to a secure digital rights management component, and a possibly re-encrypted version of the video frames is received from the secure digital rights management component. The re-encrypted version of the video frames is a version of the video frames from which the protected video content has been decrypted and re-encrypted based on a key of the computing device. The re-encrypted version of the video frames is provided to the video decoder for decoding of the re-encrypted version of the video frames, and the extracted metadata and the decoded video frames are provided to an application for playback.

In accordance with one or more aspects, in a computing device video content is obtained from a media source, the video content including multiple video frames that include metadata as well as protected video content. The metadata is extracted from the multiple video frames and provided to a video decoder. The multiple video frames are provided to a secure digital rights management component, the secure digital rights management component decrypting the protected video content and providing the decrypted content to a secure decoder component for decoding of the decrypted content. In some situations, such as when the secure decoder is capable of performing decryption, the secure digital rights management component also provides one or more decryption keys to the secure decoder. The extracted metadata and the decoded content are provided to an application for playback (e.g., in a non-secure environment).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A protected media decoding system supporting metadata is discussed herein. Media content, including video content, is protected using a digital rights management (DRM) mechanism. A computing device obtains video content that has been previously encrypted and encoded (e.g., compressed) for distribution, the video content also including various metadata such as closed captioning data. The video content is obtained by a protected media decoding system of a computing device, the protected media decoding system including DRM components and decoder components. Upon obtaining the video content previously encrypted and compressed for distribution, the metadata is extracted from the video content and provided to a decoder component, and the video content is provided to a secure DRM component. The secure DRM component decrypts the video content, and optionally re-encrypts the video content using a local key of the computing device. The re-encrypted video content can be subsequently decrypted by components in a secure layer of the computing device but cannot be decrypted by other devices (as such other devices do not have the key). As part of the decryption, the secure DRM component drops the metadata that was included in the obtained video content.

The re-encrypted content is provided to a host decoder component, which provides the re-encrypted content to a secure decoder component. The secure decoder component has access to the local key of the computing device, allowing the re-encrypted content to be decrypted as well as decoded. Alternatively, rather than re-encrypting the content, the secure DRM component can provide the decrypted content to the secure decoder component via a secure memory accessible only to secure components of the computing device (e.g., the secure DRM component and the secure decoder component). In another variation, the secure DRM component provides the obtained video content to the secure decoder component. The secure DRM component also provides one or more decryption keys or other secrets to the secure decoder component via a secure memory or other secure communication channel, allowing the secure decoder component to decrypt the video content.

The secure decoder component decodes the video content and provides (either directly or via the host decoder component) the decoded video content to an application for playback. The host decoder component also provides the extracted metadata to the application, allowing the application to use the metadata to augment and/or alter the display of the video content even though the metadata was dropped by the secure DRM component.

The techniques discussed herein allow DRM mechanisms to be employed to protect video content, while also allowing access to metadata included in the video content. Video content is decrypted and decoded in a secure layer, such as in hardware, allowing the video content to be decrypted and decoded quickly and securely. Although components in the secure layer may drop or otherwise remove the metadata, the metadata is provided to the decoding components and applications, allowing the metadata to be decoded despite being dropped or otherwise removed by other components in the secure layer. The techniques discussed herein thus provide increased functionality to be made available to users (e.g., playback of closed captioning data from DRM protected content) while maintaining the security of the DRM protected content.

References are made herein to symmetric key cryptography, public key cryptography, and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and they can both generate and verify digital signatures for that particular entity (e.g., by encrypting or decrypting the data using the symmetric key).

Figure 1:
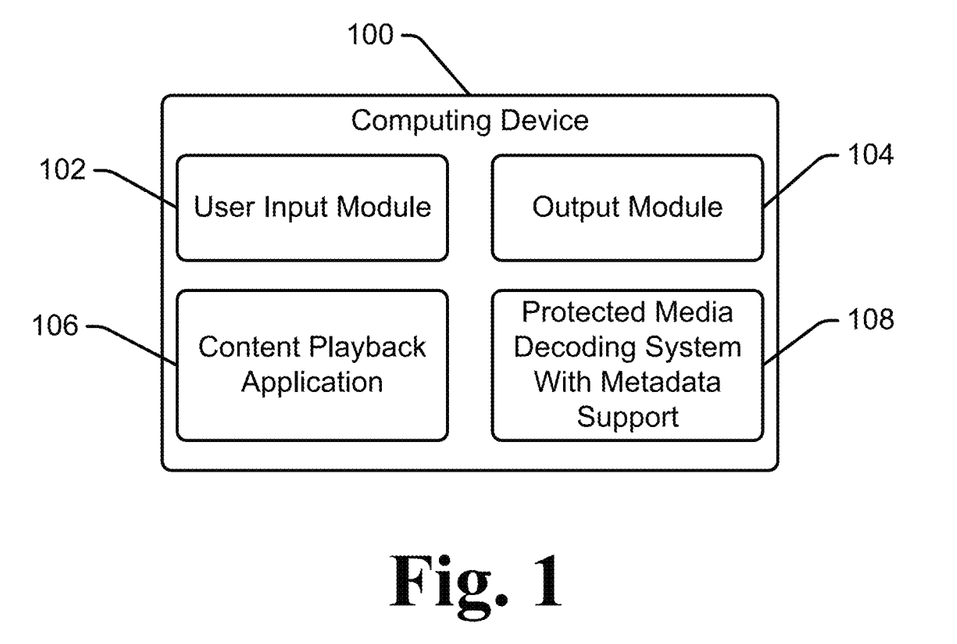
FIG. 1 is a block diagram illustrating an example computing device implementing the protected media decoding system supporting metadata in accordance with one or more embodiments.

FIG. 1 is a block diagram illustrating an example computing device 100 implementing the protected media decoding system supporting metadata in accordance with one or more embodiments. The computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, a watch), an entertainment device (e.g., an entertainment appliance, a set-top box communicatively coupled to a display device, a game console), a television or other display device, an automotive computer, and so forth. Thus, the computing device 100 may range from full resource devices with substantial memory and processor resources (e.g., personal computers, game consoles) to low-resource devices with limited memory and/or processing resources (e.g., traditional set-top boxes, hand-held game consoles).

The computing device 100 includes a user input module 102, an output module 104, a content playback application 106, and a protected media decoding system 108 with metadata support. Although particular functionality is discussed herein with reference to modules, applications, and systems, it should be noted that the functionality of individual ones of modules, applications, and systems can be separated into multiple modules, applications, and/or systems. Additionally or alternatively, at least some functionality of multiple modules, applications, and systems can be combined into a single module, application, and/or system.

The user input module 102 receives user inputs from a user of the computing device 100. User inputs can be provided in a variety of different manners, such as by pressing one or more keys of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100. User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the computing device 100. This content can be, for example, a display or playback portion of a user interface (UI), video content, and so forth. The content can be displayed or otherwise played back by components of the computing device 100 (e.g., speakers, interactive display devices, etc.). Alternatively, the output module 104 can generate one or more signals that are output to other devices or components (e.g., speakers, display devices, etc.) that are separate from the computing device 100.

The content playback application 106 manages playback of audio/video content on the computing device, via the output module 104. Decrypted and decoded content is made available to the content playback application 106 from the protected media decoding system 108 as discussed in more detail below. The content playback application 106 also obtains metadata for the content and augments and/or alters the display of the content based on the metadata as discussed in more detail below.

The protected media decoding system 108 manages the decrypting of obtained video content that has been previously encrypted and compressed for distribution, and the extraction of the metadata from the obtained video content. The protected media decoding system 108 also optionally re-encrypts the video content using a local key of the computing device 100 and decodes the video content as discussed in more detail below.

The protected media decoding system 108 and the content playback application 106 both support the DRM. Supporting the DRM refers to the protected media decoding system 108 and the content playback application 106 adhering to the restrictions on usage of the video content that are imposed by the DRM, such as restricting access to keys used to decrypt the video content, restricting where decrypted video content is stored and whether decrypted video content is accessible to other programs, and so forth.

Figure 2:
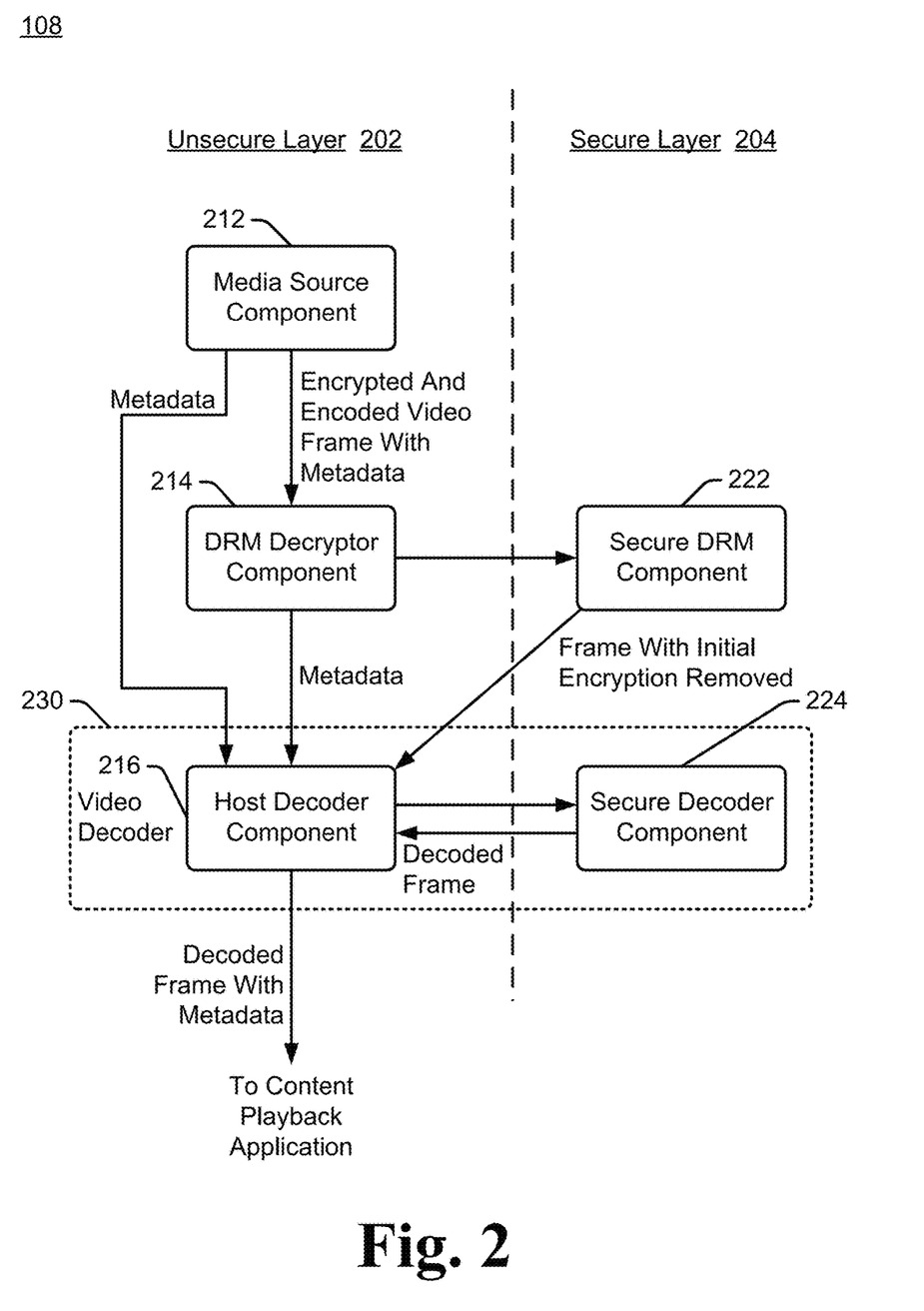
FIG. 2 illustrates an example protected media decoding system in accordance with one or more embodiments.

FIG. 2 illustrates an example of a protected media decoding system 108 in accordance with one or more embodiments. The protected media decoding system 108 includes an unsecure layer 202 and a secure layer 204. Components in the secure layer 204 have access to one or more decryption or encryption keys, allowing video content received by the protected media decoding system 108 to be decrypted and optionally re-encrypted. Components in the unsecure layer 202, however, have no access to such decryption or encryption keys. In one or more embodiments, components in the secure layer 204 are implemented in hardware, and components in the unsecure layer 202 are implemented in software. Alternatively, one or more of the components in the secure layer 204 are implemented in software, and/or one or more of the components in the unsecure layer 202 are implemented in software.

The components implemented in the unsecure layer 202 include a media source component 212, a DRM decryptor component 214, and a host decoder component 216. The components implemented in the secure layer 204 include a secure DRM component 222 and a secure decoder component 224. The secure decoder component 224 and the host decoder component 216 together make up a video decoder 230.

The media source component 212 receives or otherwise obtains video content. The obtained video content is encrypted and encoded (e.g., compressed). The media source component 212 can obtain video content from various different media sources, such as from another device or service via a data network such as the Internet, a local area network (LAN), a cellular or other phone network, an intranet, other public and/or proprietary networks, combinations thereof, and so forth. Additionally or alternatively, the media source component 212 can obtain video content from other sources, such as from a local storage device of a computing device implementing the protected media decoding system 108, from a removable storage device (e.g., a thumb drive or other flash memory device) coupled to a computing device implementing the protected media decoding system 108, and so forth.

Figure 3:
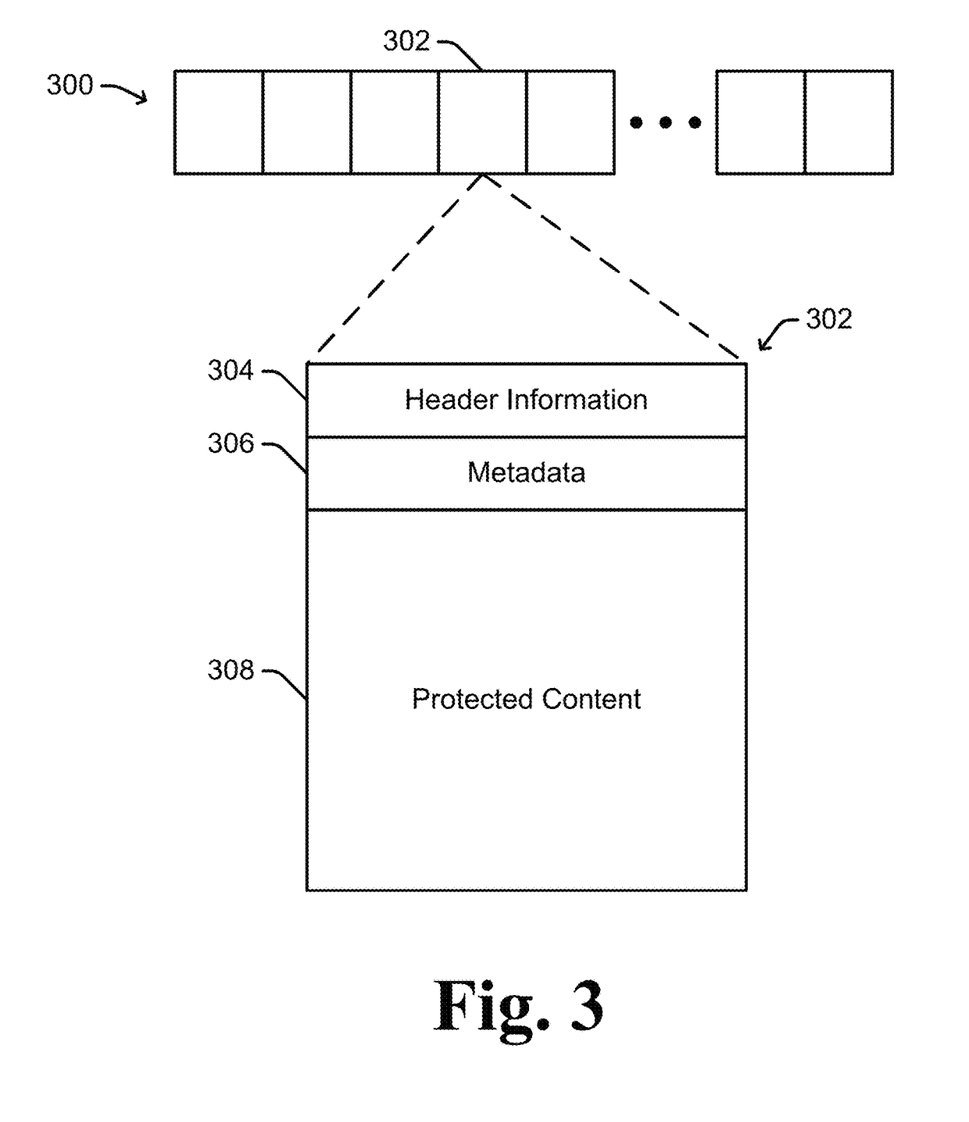
FIG. 3 illustrates an example video frame in accordance with one or more embodiments.

The video content includes multiple frames of video content. FIG. 3 illustrates an example video frame in accordance with one or more embodiments. Video content 300 includes multiple video frames, one of which (illustrated as video frame 302) is shown in additional detail. The video frame 302 includes multiple different portions or fields including header information 304, metadata 306, and protected content 308. The header information 304 describes various information regarding the video frame 302, such as an identifier of the video frame 302, a type of the video frame 302 (e.g., whether the video frame 302 is a key frame, a predicted frame (P-frame), a bi-directional predicted frame (B-frame), etc.), a size of the video frame 302, a checksum or other verifier of the video frame 302, and so forth. The particular information included as header information 304 can vary based on the manner in which video content is encoded as well as based on the desires of the developer or distributor of the video content.

The protected content 308 includes data describing a frame of video (e.g., describing what is to be displayed as the frame of video). The data may describe a frame of video on its own without reference to other video frames, or alternatively can describe a frame of video with reference to one or more other video frames. The data describing the frame is encrypted and thus is referred to as protected content.

The metadata 306 includes information describing the video content, and which can be used to augment and/or alter the display of the video frame 302. The metadata 306 can include information describing only the video frame 302, or alternatively multiple video frames of the video content of which the video frame 302 is a part. In one or more embodiments, the metadata 306 includes closed captioning data, which is text (e.g., of the words spoken in the video content) that can be displayed along with the playback of the video content. Additionally or alternatively, the metadata 306 can include other data. For example, the metadata 306 can include 3-dimensional mesh data or other depth data for the video frame, film grain effect data to add noise to the video frame to give the video frame the look of a vintage film or cinema projector, and so forth.

Returning to FIG. 2, the media source component 212 provides the video frames of the obtained video content to the DRM decryptor component 214. The video frames are protected (and thus the video content is also protected) by having the data describing the frame of video (e.g., the protected content 308 of FIG. 3) being encrypted using one or more keys. The data can be encrypted using symmetric key cryptography and/or public key cryptography. By protecting the video frames, the video content can be distributed and made available to the media source component 212 via various unsecure data storage devices and/or transmission channels.

The DRM decryptor component 214 receives video frames from the media source component 212 and provides the received video frames to the secure DRM component 222. Additionally or alternatively, the media source component 212 can provide one or more of the video frames to the secure DRM component 222 directly rather than via the DRM decryptor component 214. The secure DRM component 222 removes the protection on the video frames (decrypts the video frames) and provides the video frames with the protection removed to the video decoder 230.

The protection that is removed by the secure DRM component 222 is the initial encryption applied to the video frames (the encryption that was applied to protect the video frames prior to their being obtained by the media source component 212). The secure DRM component 222 has knowledge of the manner in which the video frames were encrypted, as well as has access to one or more keys used to decrypt the video frames, and thus can readily decrypt the video frames.

The secure DRM component 222 can provide the video frames with removed protection to the video decoder 230 in different manners. In one or more embodiments, the secure DRM component 222 re-encrypts the video frames using one or more keys that are local to the computing device implementing the protected media decoding system 108. The re-encryption can be performed using symmetric key cryptography and/or public key cryptography. These one or more keys are known to other components in the secure layer 204, thus the secure decoder component 224 is able to decrypt the re-encrypted video frames. However, these one or more keys are not known to other components in the computing device, so other components (e.g., components in the unsecure layer 202) are not able to decrypt the re-encrypted video frames. The secure DRM component 222 can provide the re-encrypted video frames to the host decoder component 216, or alternatively to the secure decoder component 224.

Alternatively, rather than re-encrypting the video frames, the secure DRM component 222 provides the decrypted video frames to the secure decoder component 224. This can be accomplished in various manners, such as by storing the decrypted video frames in memory of the computing device that is secure (e.g., accessible to components of the secure layer 204 (or accessible to just the secure DRM component 222 and the secure decoder component 224), but not accessible to components of the unsecure layer 202). Alternatively, the secure DRM component 222 can provide the re-encrypted video frames to the secure decoder component 224 directly rather than via the host decoder component 216.

Alternatively, rather than decrypting the video frames, the secure DRM component 222 can provide one or more keys used to decrypt the video frames to the secure decoder component 224. Thus, the initial encryption applied to the video frames can be removed by the secure decoder component decrypting the video frames rather than the secure DRM component 222.

Additionally, the secure DRM component 222 drops the metadata in the video frame. For example, when decrypting the data that is the protected content 308 of FIG. 3, the metadata 306 is dropped. Dropping the metadata refers to deleting or otherwise ignoring the metadata, so the secure DRM component 222 does not provide the metadata to the video decoder 230. The secure DRM component 222 drops the metadata regardless of the manner in which the secure DRM component 222 provides the video frames with removed protection to the video decoder 230.

Because the secure DRM component 222 drops the metadata from the video frames, the metadata is extracted from the encrypted and compressed video frames obtained by the media source component 212. In one or more embodiments, the metadata is extracted from the video frames by the DRM decryptor component 214. Additionally or alternatively, the metadata can be extracted from one or more video frames by the media source component 212. The extracted metadata is provided to the host decoder component 216, thus creating a separate communication channel for the metadata to the host decoder component 216, this separate communication channel bypassing the secure DRM component 222.

Extracting the metadata from a video frame refers to copying the metadata from the video frame. A copy of the metadata can optionally remain in the video frame, although since the metadata will be dropped by the secure DRM component 222 the metadata can also be removed from the video frame as part of extracting the metadata from the video frame.

It should be noted that the metadata is extracted from the video frame. Thus, rather than sending the entire compressed frame to the host decoder component 216, just the extracted metadata is sent to the host decoder component 216.

In one or more embodiments, the DRM decryptor component 214 (or alternatively the media source component 212) checks whether the metadata is encrypted and provides the metadata to the host decoder component 216 only if the metadata is not encrypted (also referred to as the metadata being clear data or plain data). If the metadata is encrypted, then the metadata is not provided to the host decoder component 216.

The determination of whether the metadata is encrypted can be made in a variety of different manners. In one or more embodiments, header information in the video frame (e.g., the header information 304 of FIG. 3) includes an indication of whether the metadata is encrypted. This indication can take various forms, such as a flag being set, an identifier of a type of encryption used for the metadata (e.g., if no such identifier is included in the header information 304, or such an identifier is included in the header information 304 and has a particular value (e.g., null or "none"), then the metadata is not encrypted), an identifier of a decryption key for the metadata (e.g., if no such identifier is included in the header information 304 then the metadata is not encrypted), an indication of the number of bytes and/or offsets (e.g., if the metadata is greater than a threshold size, then the metadata is encrypted), an indication of which regions (e.g., denoted by a start position and an end position) of the video frame are encrypted (if the metadata is within the encrypted region, then the metadata is encrypted, otherwise the metadata is not encrypted), and so forth.

Similarly, in one or more embodiments the DRM decryptor component 214 (or alternatively the media source component 212) checks whether the metadata is corrupted and provides the metadata to the host decoder component 216 only if the metadata is not corrupted (also referred to as the metadata being clear data or plain data). Whether the metadata is corrupted can be determined in a variety of different manners. For example, a checksum or other error identification code can be used to determine whether the metadata is corrupted. If the metadata is corrupted, then the metadata is not provided to the host decoder component 216.

It should be noted that, in situations in which the metadata is encrypted or corrupted, the metadata is not provided to the host decoder component 216 (by the media source component 212, the DRM decryptor component 214, or the secure DRM component 222). Thus, in such situations the metadata is not used to augment and/or alter the display of the video content. For example, if the metadata is closed captioning data, then the closed captioning data is not displayed along with the video content. Although the metadata is not used to augment and/or alter the display of the video content, the video content can still be played back, so the protected media decoding system 108 allows a basic playback experience of the video content (although not augmented and/or altered by the metadata) despite the encryption or corruption of the metadata.

The secure decoder component 224 receives the video frames with removed protection. The secure decoder component 224 can receive the video frames from the host decoder component 216, in which case the video frames are encrypted (having been previously decrypted and re-encrypted by the secure DRM component 222). The secure decoder component 224 has knowledge of the manner in which the video frames were encrypted by the secure DRM component 222, as well as one or more keys to use to decrypt the video frames, and thus can readily decrypt the video frames received from the host decoder component 216.

Alternatively, the secure decoder component 224 can receive the video frames from the secure DRM component 222, in which case the video frames may not have been re-encrypted by the secure DRM component 222. If the video frames were not re-encrypted by the secure DRM component 222, then the secure decoder component 224 need not decrypt the video frames. However, if the video frames were re-encrypted by the secure DRM component 222, then the secure decoder component 224 has knowledge of the manner in which the video frames were encrypted by the secure DRM component 222, as well as one or more keys to use to decrypt the video frames, and thus can readily decrypt the video frames received from the host decoder component 216.

Alternatively, the secure DRM component 222 can provide to the secure decoder component 224 the keys to remove the initial encryption applied to the video frames, in which case the video frames may not have been re-encrypted by the secure DRM component 222. By providing the keys to the secure decoder component 224, the secure decoder component 224 has knowledge of the manner in which the video frames were encrypted, as well as one or more keys to use to decrypt the video frames, and thus can readily decrypt the video frames received from the host decoder component 216 (or from the secure decoder component 224).

The secure decoder component 224 decodes the video frame (after the video frame has been decrypted). Decoding the video frame refers to converting the video frame to a format that can be displayed as an image frame by a content playback application (e.g., the content playback application 106 of FIG. 1). The secure decoder component 224 has knowledge of the manner in which the video frame is to be decoded and can readily do so.

In one or more embodiments, the host decoder component 216 provides various parameters to the secure decoder component 224 indicating how to decode the video frame. These parameters can include, for example, a location in memory in which the decoded video frame is to be stored, the resolution of the video frame, and so forth. Given these parameters, the secure decoder component 224 decodes the video frame, generating an image frame (e.g., in the red, green, blue (RGB) color space or in the luma and chrominance (YUV) color space) that is provided to the content playback application for playback.

The decoded video frame from the secure decoder component 224 is provided to the content playback application for playback. The video frame can be provided directly to the content playback application (e.g., stored by the secure decoder component 224 in a memory location expected by the content playback application). Alternatively, the video frame can be provided to the host decoder component 216, which provides the video frame to the content playback application. The uncompressed video frame data (e.g., the RGB or YUV data) can remain in a secure memory location (e.g., accessible only to components in the secure layer 204) so that applications or other components in the unsecure layer 202 do not have access to the uncompressed video frame data. However, the display hardware or other secure hardware in the secure layer 204 can access this uncompressed video frame data.

The host decoder component 216 also provides to the content playback application the metadata that the host decoder component 216 receives from the media source component 212 or the DRM decryptor component 214. This allows the content playback application to augment and/or alter the display of the video frame based on the metadata. For example, if the metadata is closed captioning data, then the content playback application augments the display of the video content by displaying the closed captioning data along with displaying the video content. By way of another example, if the metadata is film grain effect data to add noise to the video frame to give the video frame the look of a vintage film or cinema projector, then the content playback application alters the display of the video content by adding the noise to the video frames of the video content.

The metadata is extracted from the video frames as discussed above and is received via a different communication channel than the re-encrypted video frames received from the secure DRM component 222. The host decoder component 216 operates to maintain synchronization between the metadata and the re-encrypted video frames, allowing the content playback application to know which metadata is associated with which de-coded video frame. This synchronization can be maintained in any of a variety of different manners. In one or more embodiments, each re-encrypted video frame is stored in a data structure that includes a pointer to (or other identifier of) the metadata that was extracted from that video frame. Alternatively, the host decoder component 216 can use any other type of mapping to maintain the synchronization between the metadata and the re-encrypted video frames.

The protected media decoding system 108 is discussed above with reference to video content. It should be noted that media content may also include audio content and that the audio content can be decrypted and decoded in an analogous manner as the video content. For example, rather than operating on video content (or solely video content), the secure DRM component 222 can also decrypt audio frames of audio content, and the secure decoder component 224 can decode audio frames of audio content. Audio content typically does not include metadata, and thus metadata would not be extracted from the obtained audio content. However, if the audio content were to include metadata, then the metadata can be extracted from the audio frames of the audio content analogous to the extraction of the metadata from the video frames of the video content.

Figure 4:
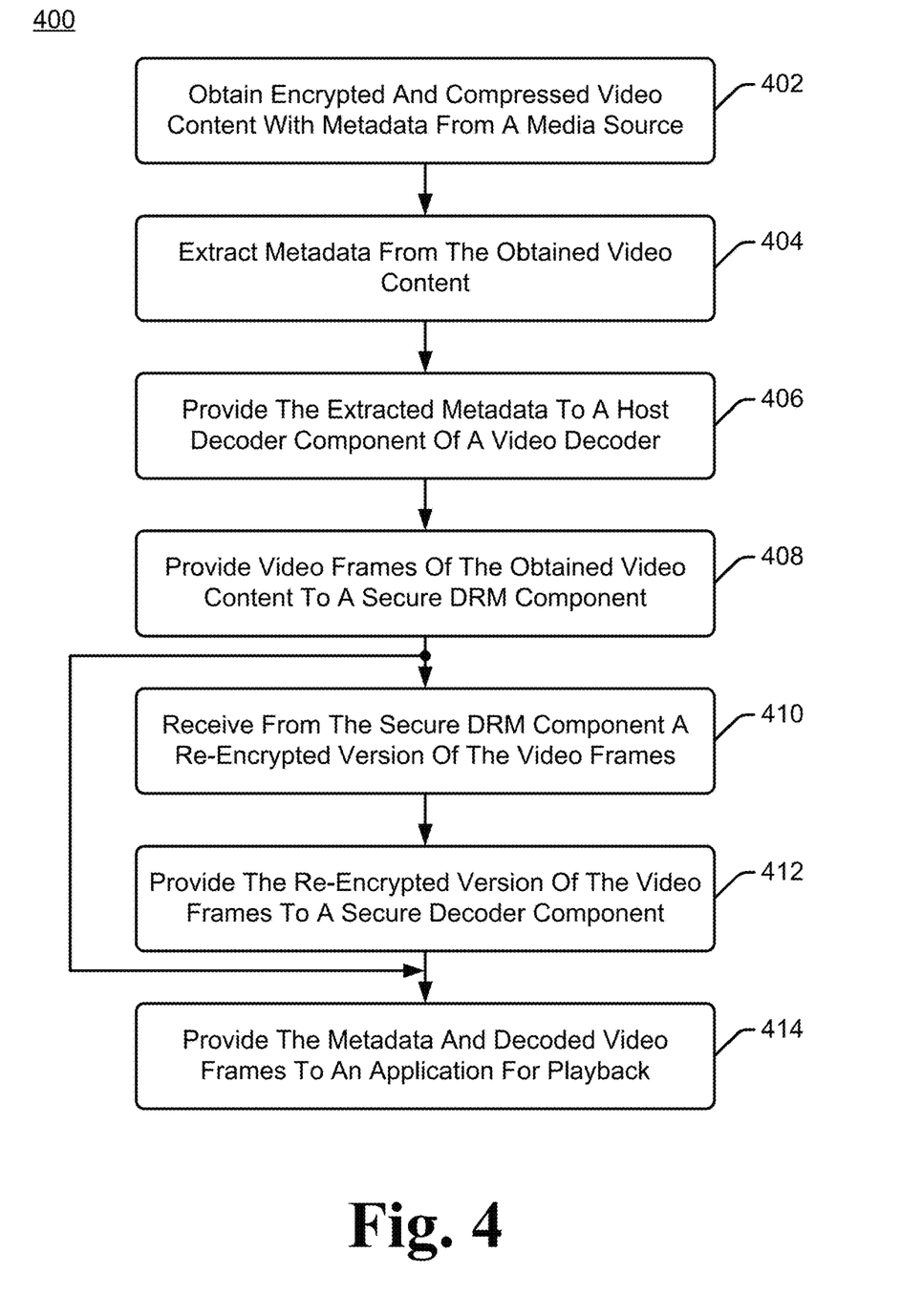
FIG. 4 is a flowchart illustrating an example process for supporting metadata in a protected media decoding system in accordance with one or more embodiments.

FIG. 4 is a flowchart illustrating an example process 400 for supporting metadata in a protected media decoding system in accordance with one or more embodiments. Process 400 is carried out by components of a protected media decoding system, such as components of the protected media decoding system 108 of FIGS. 1 and 2, and can be implemented in software, firmware, hardware, or combinations thereof. Process 400 is shown as a set of acts and is not limited to the order shown for performing the operations of the various acts. Process 400 is an example process for supporting metadata in a protected media decoding system; additional discussions of supporting metadata in a protected media decoding system are included herein with reference to different figures.

In process 400, encrypted and compressed video content with metadata is obtained from a media source (act 402). The content can be obtained from any of a variety of different media sources as discussed above.

Metadata is extracted from the obtained video content (act 404). In one or more embodiments, the metadata is extracted only if the metadata is not encrypted and is not corrupted, as discussed above. The metadata is extracted by an extraction component, which can be the media source component or the DRM decryptor content as discussed above.

The extracted metadata is provided to a host decoder component (act 406). Just the extracted metadata is provided to the host decoder—the entire video frame is not provided as discussed above.

Video frames of the obtained video content are also provided to a secure DRM component (act 408). The video frames can be provided to the secure DRM component by the media source component or the DRM decryptor content, as discussed above.

In one or more embodiments, the secure DRM component decrypts the video frames of the video content and re-encrypts the video frames using one or more keys of the computing device implementing the protected media decoding system implementing the process 400. The re-encrypted versions of the video frames are received from the secure DRM component (act 410). The re-encrypted version of a video frame is a version of the video frame from which the initial protection has been removed (the encrypted content obtained in act 402 is decrypted). These re-encrypted versions of the video frames of the video content are provided to a secure decoder component for decoding (act 412). This decoding can be performed in various manners as discussed above.

Alternatively, the secure DRM component may not re-encrypt the video frames. Rather the secure DRM component may provide the video frames (optionally decrypted) to the secure decoder component in other manners, such as using memory that is accessible to components in a secure layer but inaccessible to other components as discussed above. In such situations, acts 410 and 412 need not be performed.

Regardless of how the video frames are provided to the secure decoder component, the secure decoder component obtains the video frames and decodes the video frames for playback by a content playback application as discussed above. The metadata extracted in act 406 as well as the decoded video frames are provided to an application for playback (act 414). This application is the content playback application as discussed above. The content playback application displays the video content to augment and/or alter the display of the video frame based on the metadata as discussed above.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
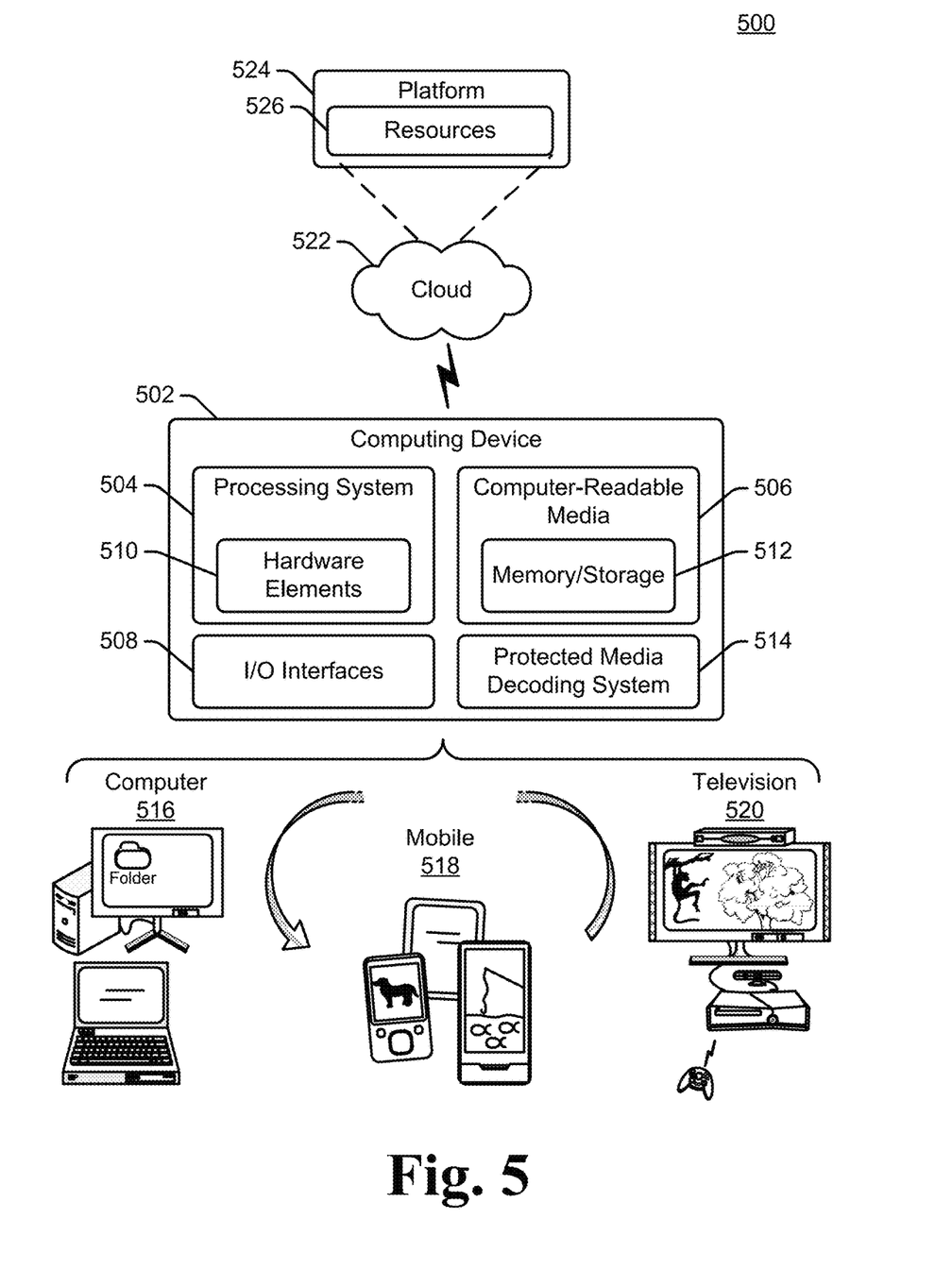
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random-access memory (RAM)) and/or nonvolatile media (such as read-only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a protected media decoding system 514. The protected media decoding system 514 supports metadata as discussed above. The protected media decoding system 514 can be, for example, the protected media decoding system 108 of FIGS. 1 and 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radiofrequency (RF), infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: obtaining video content from a media source, the video content including multiple video frames that include metadata as well as protected video content; extracting the metadata from the multiple video frames; providing the extracted metadata to a video decoder; providing the multiple video frames to a secure digital rights management component; receiving, from the secure digital rights management component, a re-encrypted version of the multiple video frames, the re-encrypted version of the multiple video frames comprising a version of the multiple video frames from which the protected video content has been decrypted and re-encrypted based on a key of the computing device; providing the re-encrypted version of the multiple video frames to the video decoder for decoding of the re-encrypted version of the multiple video frames; and providing the extracted metadata and the decoded video frames to an application for playback.

Alternatively or in addition to any of the above described methods, any one or combination of: the providing the extracted metadata to the video decoder comprising providing the extracted metadata to the video decoder only if the metadata is clear data; the metadata comprising closed captioning data; the providing the extracted metadata to the video decoder comprising providing the extracted metadata to the video decoder from a media source component that obtains the video content; the providing the extracted metadata to the video decoder comprising providing the extracted metadata to the video decoder from a digital rights management decryptor component that provides the multiple video frames to the secure digital rights management component; and the providing the multiple video frames to the secure digital rights management component comprising providing, by a digital rights management decryptor component, the multiple video frames to the secure digital rights management component, the digital rights management decryptor component being implemented in an unsecure layer of the computing device and the secure digital rights management component being implemented in a secure layer of the computing device, components in the secure layer having access to one or more keys to decrypt the protected video content, and components in the unsecure layer having no access to the one or more keys to decrypt the protected video content.

A method implemented in a computing device, the method comprising: obtaining video content from a media source, the video content including multiple video frames that include metadata as well as protected video content; extracting the metadata from the multiple video frames; providing the extracted metadata to a video decoder; providing the multiple video frames to a secure digital rights management component, the secure digital rights management component decrypting the protected video content and providing the decrypted content to a secure decoder component for decoding of the decrypted content; and providing the extracted metadata and the decoded content to an application for playback.

Alternatively or in addition to any of the above described methods, any one or combination of: the secure digital rights management component and the secure decoder component being implemented as part of a secure layer of the computing device, only components in the secure layer having access to one or more keys to decrypt the protected video content, the providing the multiple video frames to the secure digital rights management component comprising storing the decrypted content in memory of the computing device that is accessible to only components of the secure layer; the providing the extracted metadata to the video decoder comprising providing the extracted metadata to the video decoder only if the metadata is clear data; the metadata comprising closed captioning data; the providing the extracted metadata to the video decoder comprising providing the extracted metadata to the video decoder from a media source component that obtains the video content; and the providing the extracted metadata to the video decoder comprising providing the extracted metadata to the video decoder from a digital rights management decryptor component that provides the multiple video frames to the secure digital rights management component.

A computing device comprising: a media source component configured to obtain video content from a media source, the video content including multiple video frames that include metadata as well as protected video content; an extraction component configured to extract the metadata from the multiple video frames and provide the extracted metadata to a video decoder; a secure digital rights management component configured to receive the multiple video frames and provide the protected video content to a video decoder; and a video decoder component configured to provide the extracted metadata and the decoded content to an application for playback.

Alternatively or in addition to any of the above described computing devices, any one or combination of: the secure digital rights management component being further configured to decrypt the protected video content, and provide, to the video decoder as the protected video content, the decrypted content; the secure digital rights management component being further configured to provide, to the video decoder as the protected video content, the protected video content in the multiple video frames as well as one or more keys, and the video decoder component being further configured to decrypt the protected video content; the extraction component and the media source component comprising the same component; the extraction component comprising a digital rights management decryptor component that is further configured to receive the multiple video frames from the media source component and provide the multiple video frames to the secure digital rights management component; the secure digital rights management component being further configured to decrypt the protected content and re-encrypt the decrypted content based on a key of the computing device prior to providing the decrypted content to the video decoder; the secure digital rights management component being implemented in a secure layer, the extraction component being implemented in an unsecure layer, and only components in the secure layer having access to one or more keys to decrypt the protected video content; and the secure digital rights management component being implemented in hardware.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented in a computing device, the method comprising:
   obtaining video content from a media source, the video content including metadata as well as protected video content;
   extracting the metadata from the video content to obtain extracted metadata, the extracting the metadata including removing the metadata from the video content;
   providing the extracted metadata to a video decoder without providing the video content to the video decoder for processing by the video decoder;
   providing the video content with the metadata removed from the extracting to a secure digital rights management component;
   receiving, from the secure digital rights management component, a re-encrypted version of the video content, the re-encrypted version of the video content comprising a version of the video content from which the protected video content has been decrypted and re-encrypted based on a key of the computing device;
   providing the re-encrypted version of the video content to the video decoder for decoding of the re-encrypted version of the video content to yield decoded video content rather than decoding of the video content including metadata; and
   providing the extracted metadata and the decoded video content to an application for playback.

2. The method of claim 1, the providing the extracted metadata to the video decoder comprising providing the extracted metadata to the video decoder only if the metadata is clear data.

3. The method of claim 1, the metadata comprising closed captioning data.

4. The method of claim 1, the providing the extracted metadata to the video decoder comprising providing the extracted metadata to the video decoder from a media source component that obtains the video content.

5. The method of claim 1, the providing the extracted metadata to the video decoder comprising providing the extracted metadata to the video decoder from a digital rights management decryptor component that provides the video content to the secure digital rights management component.

6. The method of claim 1, the providing the video content with the metadata removed from the extracting to the secure digital rights management component comprising:
   providing, by a digital rights management decryptor component, the video content with the metadata removed from the extracting to the secure digital rights management component, the digital rights management decryptor component being implemented in an unsecure layer of the computing device and the secure digital rights management component being implemented in a secure layer of the computing device, components in the secure layer having access to a key to decrypt the protected video content, and components in the unsecure layer having no access to the key to decrypt the protected video content.

7. A method implemented in a computing device, the method comprising:
   obtaining video content from a media source, the video content including metadata as well as protected video content;
   extracting the metadata from the video content to obtain extracted metadata, the extracting the metadata including removing the metadata from the video content;
   providing the extracted metadata to a video decoder without providing the video content to the video decoder for processing by the video decoder;
   providing the video content with the metadata removed from the extracting to a secure digital rights management component, the secure digital rights management component decrypting the protected video content and providing decrypted video content to a secure decoder component for decoding of the decrypted video content to yield decoded video content rather than decoding of the video content including metadata; and
   providing the extracted metadata and the decoded video content to an application for playback.

8. The method of claim 7, the secure digital rights management component and the secure decoder component being implemented as part of a secure layer of the computing device, only components in the secure layer having access to one or more keys to decrypt the protected video content, the providing the video content with the metadata removed from the extracting to the secure digital rights management component comprising storing the decrypted video content in memory of the computing device that is accessible only to the components in the secure layer.

9. The method of claim 7, the providing the extracted metadata to the video decoder comprising providing the extracted metadata to the video decoder only if the metadata is clear data.

10. The method of claim 7, the metadata comprising closed captioning data.

11. The method of claim 7, the providing the extracted metadata to the video decoder comprising providing the extracted metadata to the video decoder from a media source component that obtains the video content.

12. The method of claim 7, the providing the extracted metadata to the video decoder comprising providing the extracted metadata to the video decoder from a digital rights management decryptor component that provides the video content with the metadata removed from the extracting to the secure digital rights management component.

13. A computing device comprising:
- a media source component configured to obtain video content from a media source, the video content including metadata as well as protected video content;
- an extraction component configured to extract the metadata from the video content to obtain extracted metadata, extracting the metadata including removing the metadata from the video content, and provide the extracted metadata to a video decoder without providing the video content to the video decoder for processing by the video decoder;
- a secure digital rights management component configured to receive the video content with the metadata removed from the extracting and provide the protected video content to the video decoder for decoding of the protected video content to yield decoded video content rather than decoding of the video content including metadata; and
- a video decoder component configured to provide the extracted metadata and the decoded video content to an application for playback.

14. The computing device of claim 13, the secure digital rights management component being further configured to:
- decrypt the protected video content to obtain decrypted video content; and
- provide, to the video decoder as the protected video content, the decrypted video content.

15. The computing device of claim 13, the secure digital rights management component being further configured to provide, to the video decoder as the protected video content, the protected video content in the video content as well as one or more keys, and the video decoder component being further configured to decrypt the protected video content.

16. The computing device of claim 13, the extraction component and the media source component comprising the same component.

17. The computing device of claim 13, the extraction component comprising a digital rights management decryptor component that is further configured to receive the video content from the media source component and provide the video content with the metadata removed from the extracting to the secure digital rights management component.

18. The computing device of claim 13, the secure digital rights management component being further configured to decrypt the protected video content to obtain decrypted video content and re-encrypt the decrypted video content based on a key of the computing device prior to providing the decrypted video content to the video decoder.

19. The computing device of claim 13, the secure digital rights management component being implemented in a secure layer, the extraction component being implemented in an unsecure layer, and only components in the secure layer having access to one or more keys to decrypt the protected video content.

20. The computing device of claim 19, the secure digital rights management component being implemented at least partially in hardware.

* * * * *